United States Patent [19]
Simmons

[11] 3,935,443
[45] Jan. 27, 1976

[54] ILLUMINATED ANIMAL COLLAR AND LEASH

[76] Inventor: Allen P. Simmons, 4661 W. 8 Place, Hialeah, Fla. 33012

[22] Filed: Aug. 26, 1974

[21] Appl. No.: 500,460

[52] U.S. Cl. ............... 240/6.4 W; 240/1 EL; 240/59; 340/321; 350/96 R
[51] Int. Cl.² ......................................... F21V 33/00
[58] Field of Search ..... 240/6.4 R, 6.4 W, 59, 1 EL; 340/321; 350/96 R

[56] References Cited
UNITED STATES PATENTS

| | | | |
|---|---|---|---|
| 2,721,257 | 10/1955 | Knox | 240/6.4 W X |
| 3,521,049 | 7/1970 | Young | 240/6.4 W |
| 3,549,878 | 12/1970 | Bailey | 240/6.4 W |
| 3,790,775 | 2/1974 | Rosenblatt | 240/6.4 W X |

*Primary Examiner*—Richard A. Wintercorn
*Attorney, Agent, or Firm*—Oltman and Flynn

[57] ABSTRACT

An animal collar of translucent plastic material including a plurality of electric lamps secured along a predetermined length of the collar including a battery circuit means for supplying electric energy to the lamps. A translucent leash having spaced lamps therein and terminating at one end in a battery equipped supply handle and a snap means for engaging a ring on the collar. An alternate form of collar shows a lamp source of illumination connected to a plurality of translucent tubing of various lengths, containing light transmitting optical fiberglass filaments for radiating light from the collar including a connection for a battery energy supply.

8 Claims, 10 Drawing Figures

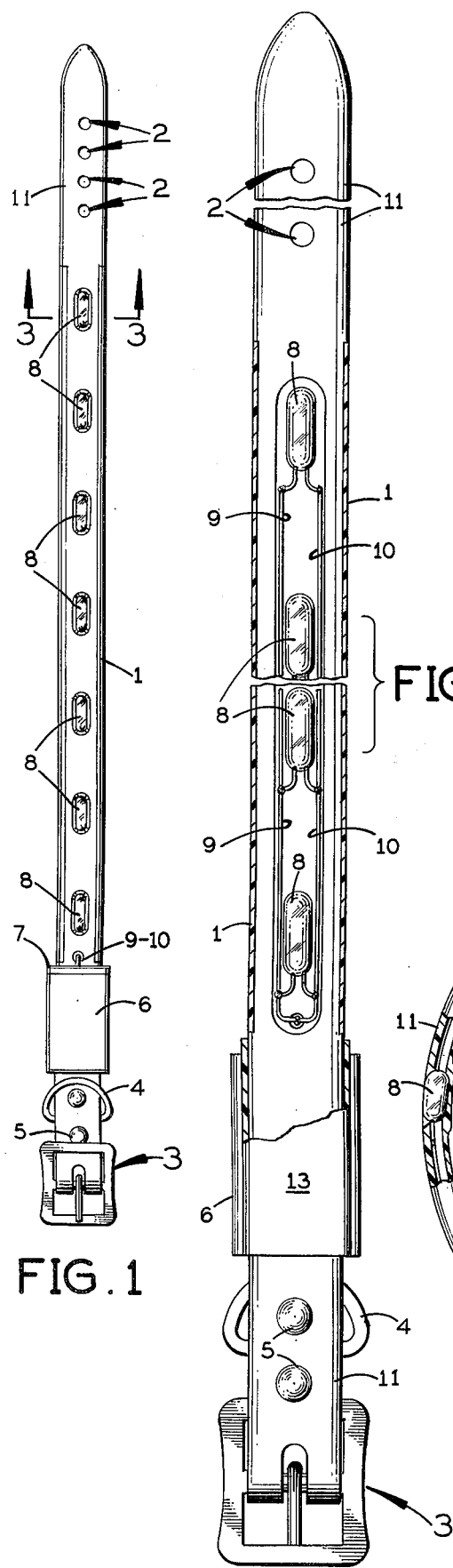
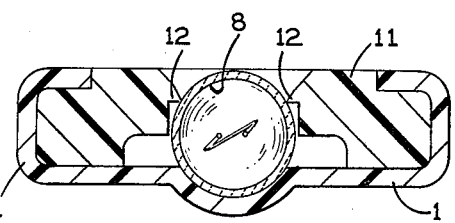
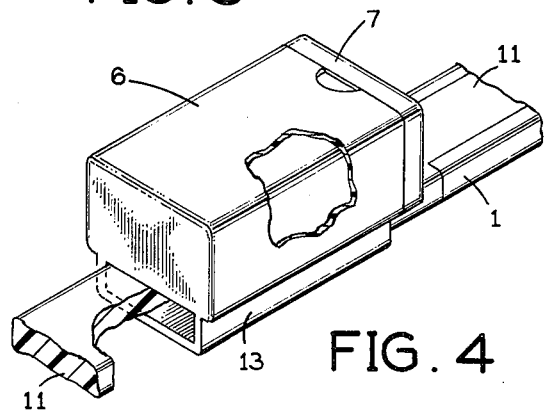
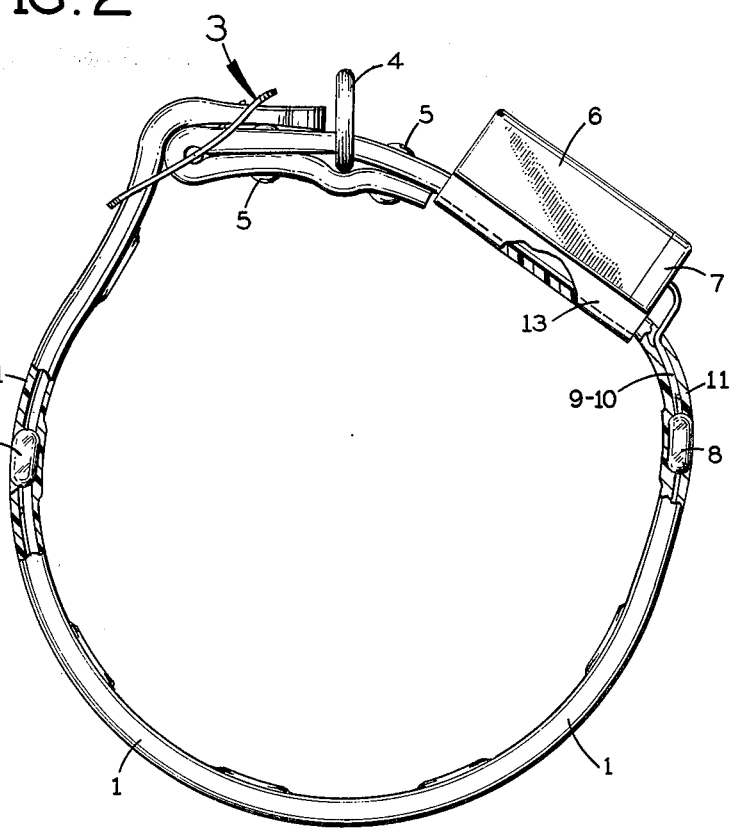

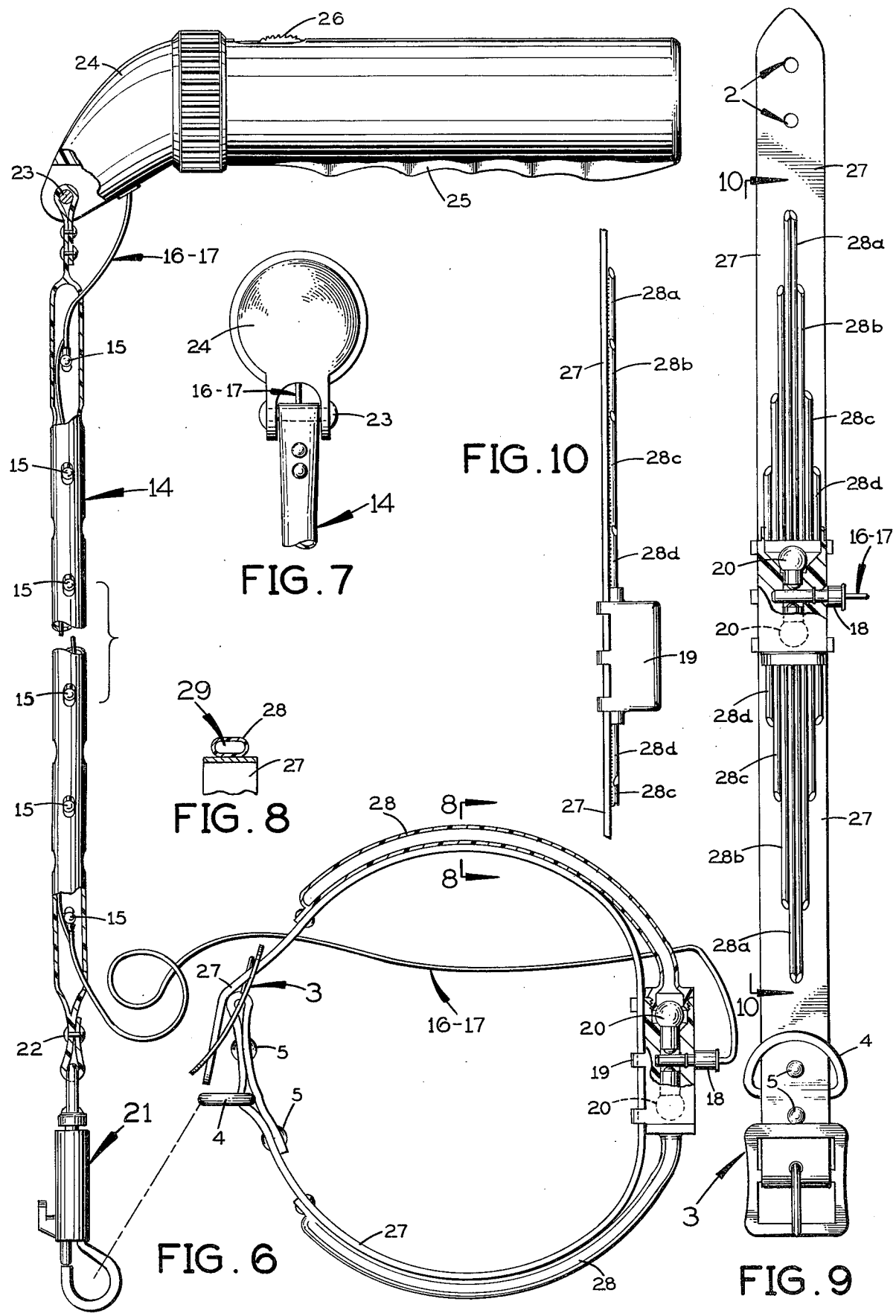

ILLUMINATED ANIMAL COLLAR AND LEASH

This invention relates in general to an illuminated animal collar, more often for dogs, including a leash therefor and more particularly a collar and leash supplied with electric illumination from a small dry cell battery source whereby both the collar and leash would be clearly visible reasonable distances in partial or total darkness. It is apparent that the use of the illuminated collar and/or leash will provide protection against a vehicle or other impact accidents occurring in darkness.

Prior attempts to illuminate animal collars depended upon luminous substances applied to the collar which produced no warning except in the presence of partial light.

The present invention is effective in partial or total darkness and is effective over a relatively long period of time when long life batteries are used.

A further advantage of the invention resides in the low cost molding of a plastic collar as compared with the well known leather types, which have a relatively short life.

These and other objects and advantages in two embodiments of the invention are described and shown in the following specification and drawings, in which:

FIG. 1 is an outside plan view of the first form of electric lighted collar in reduced scale.

FIG. 2 is a fragmentary bottom view of a life size collar with a portion thereof broken away.

FIG. 3 is an enlarged cross sectional view taken through section line 3—3, FIG. 1.

FIG. 4 is a fragmentary perspective view of the battery case attached to the collar shown in FIG. 1.

FIG. 5 is a side elevation of the collar when normally buckled.

FIG. 6 is a fragmentary view of an electric illuminated leash assembly connected to a battery retainer handle with the leash shown in linear and buckled position.

FIG. 7 is a fragmentary front end view of the leash assembly secured to the handle.

FIG. 8 is a cross sectional view taken through section line 8—8, FIG. 6.

FIG. 9 is an outer plan view of an alternate collar with a portion thereof broken away.

FIG. 10 is a fragmentary side veiw of the collar shown in FIG. 9 including the lamp casing.

Referring to FIG. 1, a main collar band 1 is molded from a flexible transparent or translucent plastic material, such as one of the well known vinyl or methacrylate compounds. The pointed outer end of the collar band is provided with a plurality of buckle adjustment holes 2. The opposite end of the collar band contains a well known buckle assembly 3 and a leash ring 4 secured by a pair of rivets 5. A battery container 6 contains a terminal for connecting the battery to a lamp circuit and is provided with a removable cover 7 and dimensioned to contain either a single or multiple cell battery.

FIG. 2 shows a fragmentary enlarged view having a broken away portion, illustrating a plurality of miniature filament lamps 8 connected in parallel to common conductors 9 and 10, which are also connected to the battery terminals in container 6.

FIG. 3 illustrates the elongated flexible plastic collar band member 11 which as displaceable mating corners 12-12 for retaining miniature lamps 8 forced securely in spaced recesses along the central groove portion of member 11.

FIG. 4 illustrates the collar band 1 and member 11 and a rectangular mounting portion 13 for retaining the battery container 6 which in this illustration is adapted to receive a pair of batteries in order to provide approximately three volts to the lamps, which will have greater life than a small single battery.

FIG. 5 illustrates the collar assembly engaged with the buckle assembly 3 including leash ring 4 secured by rivets 5—5. This view also shows the integral rectangular portion 13 for retaining battery container 6, as well as the spaced lamps 8, which in this embodiment total seven. It is also apparent that the batteries, not shown, are connected to lamps 8 by conductors 9 and 10.

It is to be noted that a small multi-cell dry battery, such as one providing approximately nine volts and the parallel circuit to the lamps changed to a simple series circuit or a divided series parallel circuit to the battery, will result in extended hourly periods of illumination as compared to the circuit shown in FIG. 2.

Referring to FIG. 6, an illuminated flexible plastic tubular leash assembly 14 is preferably formed from a transparent or translucent round plastic tube and contains a plurality of spaced electric lamps 15 which may be connected in series, parallel, or both, by a dual conductor 16-17 which terminates in a plug 18 which is adapted for insertion in a mating socket in a housing 19, which contains one or two lamps 20.

The outer end of the leash assembly 14 is formed around a loop in the swivel snap assembly 21 and retained by rivet 22. It is apparent that the snap assembly 21 may be manually attached to ring 4. The opposite end of the assembly 14 is secured to a clevis member 23 of an offset extension 24 of a container 25 which is adapted to receive one or more series connected batteries with a control on-off switch 26 conveniently positioned thereon.

Referring to FIGS. 6, 9, and 10, a main collar band 27 preferably made of flexible plastic material is secured to the buckle assembly 3 with the opposite end provided with the usual holes for adjustable engagement therewith.

FIGS. 9 and 10 illustrate the main collar band 27 on which is secured by suitable adhesive a plurality of two opposite like translucent oval tubes 28a, b, c, and d, of different lengths, the inner ends of which enter opposite ends of housing 19 and expose to one or a pair of lamps 20, as shown. It is to be noted that each of the tubes 28 are snugly filled with optic conductive fiberglass filaments 29, illustrated by FIG. 8. The filament is retained in the tubes by compatible adhesive which is also used to secure the tubes 28 to the collar band 27.

In operation and referring to the collar shown in FIG. 1, it is apparent that when the battery is secured in the container 6, a circuit will be completed to all lamps 8 and thus the collar when secured to a dog or other animal will be clearly visible in darkness.

Referring to the collar and leash shown in FIG. 6, the container 25 is of typical flashlight variety and would receive one or more batteries in series connection and a plurality of lamps would be subject to voltage supplied by battery or batteries supplied by conductors 16-17.

Since one end of all the optical fiberglass filaments terminate in close proximity to lamps 20—20, the light rays therefrom will be carried along the optical fiberglas filaments and present four oval pairs of bright light areas spaced along each half of the collar band 27.

Thus it is apparent from FIGS. 1 and 9 that the collar may be used in connection with the same electric energy used to illuminate the leash shown in FIG. 6 without the collar battery by providing a socket in container 6 for plug 18.

Referring to FIG. 9, the light conducting filament type collar shown will operate with sufficient intensity with a single lamp instead of two lamps particuarly if a multi-cell battery and a lamp of corresponding voltage is utilized.

It is also apparent that a two or three cell series connected battery may be used in a larger housing 19, shown in FIG. 10, for operation and use of a conventional leash.

It is also obvious to those skilled in the electric art that rechargeable batteries may be more economical and greatly extend the hourly use of each of the collars.

The leash shown in FIG. 6 may be made without lamps therein but including a pair of conductors substituted and connected to housing 19 with a plug 18 at one end thereof, with the opposite end terminating in a connection in the offset extension 24 of container 25.

It is to be understood that the words "transparent" and "translucent" are to be considered equivalents.

It is also to be understood that certain modifications in construction are intended to come within the teachings and scope of the above specification.

Having described my invention, I claim:

1. An illuminated animal collar and leash assembly comprising:
    a flexible collar having electrically-energized light source means therein;
    an elongated, flexible leash connected at one end to said collar and having electrically-energized light source means therein providing localized illumination spots along the length of the leash;
    and battery means connected to said light source means in the leash and said light source means in the collar for energizing the same.

2. A collar and leash assembly according to claim 1, wherein said collar comprises an elongated band of light-transmitting material, and said light source means in the collar comprises a plurality of lamps mounted in said band at different locations spaced apart along its length.

3. A collar and leash assembly according to claim 2, wherein said battery means comprises one or more batteries mounted directly on said collar and connected to said plurality of lamps in the collar.

4. A collar and leash assembly according to claim 1, wherein said light source means in the collar comprises lamp means and a plurality of elongated optical fibers positioned to be illuminated at one end by said lamp means and terminating away from the latter at different locations along the length of the collar.

5. A collar and leash assembly according to claim 4, and further comprising:
    a handle connected to the opposite end of the leash from collar and holding said battery means;
    electrical wiring extending between said battery means in the handle and said light source means in the leash and extending to said collar;
    and a plug-and-socket detachable connector between said wiring in the leash and said lamp means on the collar for electrically connecting said lamp means on the collar to said battery means in the handle.

6. A collar and leash assembly according to claim 5, wherein said leash comprises an elongated tube of flexible, light-transmitting material having a plurality of openings spaced apart along its length, and said light source means in the leash comprises a plurality of lamps mounted respectively at said openings in the tube and providing said localized illumination spots on the leash.

7. A collar and leash assembly according to claim 1 and further comprising:
    a handle connected to the opposite end of the leash from the collar and holding said battery means;
    electrical wiring extending between said battery means in the handle and said light source means in the leash and extending along the leash to said collar;
    and a plug-and-socket detachable connector between said wiring in the leash and said light source means in the collar for electrically connecting said light source means in the collar to said battery means in the handle.

8. A collar and leash assembly according to claim 1, wherein said leash comprises an elongated tube of flexible, light-transmitting material having a plurality of openings spaced apart along its length, and said light source means in the leash comprises a plurality of lamps mounted respectively at said openings in the tube and providing said localized illumination spots on the leash.

* * * * *